Figure 2:
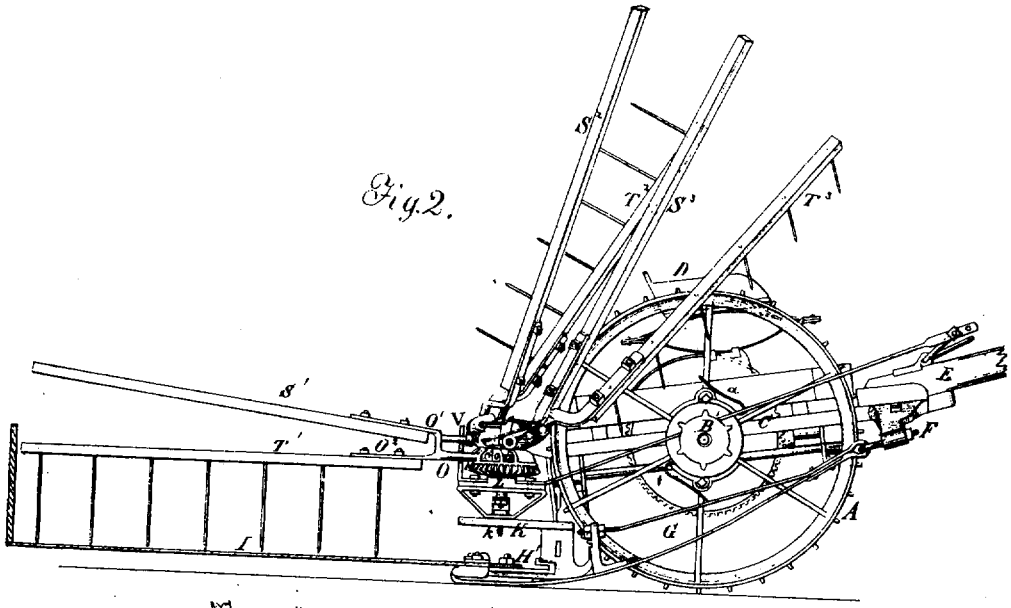

2. Sheets. Sheet 1.

A. Rank,
Harvester Rake.

No. 4089. Reissued Aug. 2. 1870.

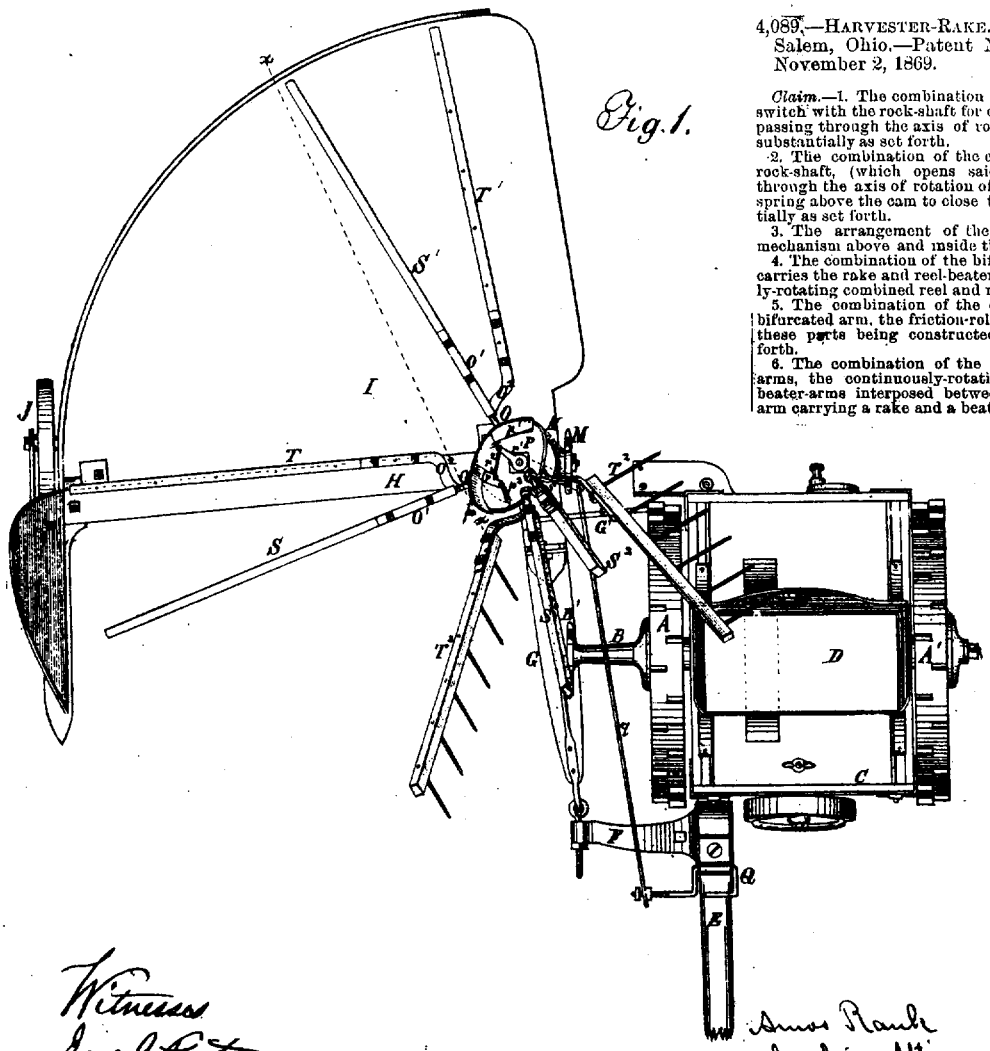

4,089.—HARVESTER-RAKE. — Amos Rank, Salem, Ohio.—Patent No. 96,353, dated November 2, 1869.

*Claim.*—1. The combination of the cam and its switch with the rock-shaft for opening the switch, passing through the axis of rotation of the rakes, substantially as set forth.

2. The combination of the cam, the switch, the rock-shaft, (which opens said switch,) passing through the axis of rotation of the rakes, and the spring above the cam to close the switch, substantially as set forth.

3. The arrangement of the switch-controlling mechanism above and inside the cam, as set forth.

4. The combination of the bifurcated arm, which carries the rake and reel-beater with a continuously-rotating combined reel and rake, as set forth.

5. The combination of the cam, the switch, the bifurcated arm, the friction-roller and its arm o, all these parts being constructed to operate as set forth.

6. The combination of the series of bifurcated arms, the continuously-rotating rakes and the beater-arms interposed between the rakes, each arm carrying a rake and a beater, as set forth.

Witnesses
Joe. D. Peyton
Baltis De Long.

Amos Rank
by his Atty
Wm. D. Edmunds

2. Sheets, Sheet 2.

A. Rank,
Harvester Rake.

No. 4089

Reissued Aug. 2. 1870

Witnesses
Jos. J. Peyton,
Baltis De Long.

Amos Rank
by his Atty
Wm D. Baldwin

United States Patent Office.

AMOS RANK, OF SALEM, OHIO.

*Letters Patent No.* 96,353, *dated November* 2, 1869; *reissue No.* 4,089, *dated August* 2, 1870.

IMPROVEMENT IN HARVESTER-RAKES.

The Schedule refe red to in these Letters Patent and making part of the same.

*To all whom it may concern*:

Be it known that I, AMOS RANK, of Salem, in the county of Columbiana and State of Ohio, have invented certain new and useful Improvements in Harvester-Rakes, of which the following is a full, clear, and exact description.

My invention relates to that class of harvester-rakes in which a series of radial, independently-pivoted, combined rake and reel-arms revolve around a vertical shaft, (or one nearly vertical,) in combination with a guiding-cam and switch, all these parts being so constructed and operated that the driver can, at will, cause any one of the rake-arms to sweep the gavel from the platform, while the rakes not so employed act merely as beaters to press the standing grain back upon the platform.

The object of my invention is to increase the efficiency of the rake, to diminish its cost, and to render it compact in its arrangement; and The distinguishing characteristics of my invention are the location of a cam (provided with a suitable switch and latch) above the rake-arms, the operation of the mechanism by which the path of the rake is varied from the inner side of said cam, and the employment of bifurcated arms to carry alternate rakes and beaters.

In the accompanying drawing the improvements herein claimed are shown as adapted to the well-known "Ætna" harvester, on which sundry Letters Patent of the United States heretofore have been obtained by me. It is obvious, however, that these improvements readily might be adapted to harvesters of a construction differing from that herein sh wn, such, for instance, as a "front-cut" machine, or to machines having finger-beams rigidly connected with the main frame.

Figure 1 represents a plan or top view of so much of my improved machine as is necessary to illustrate the invention herein claimed.

Figure 2, a side elevation of the same, partly in section, at the line *x x* of fig. 1.

Figure 3:
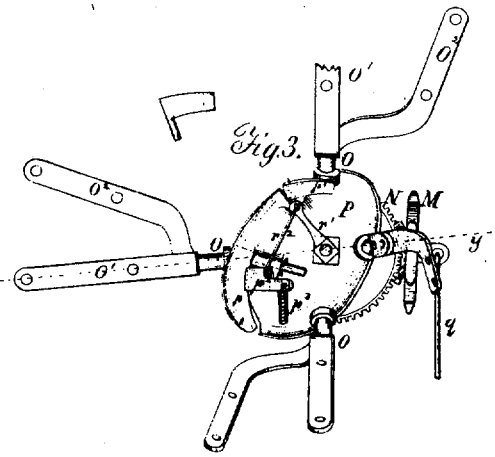

Figure 3, a plan or top view, on an enlarged scale, of portions of the rake-mechanism, det. [illegible]

Figure 4:
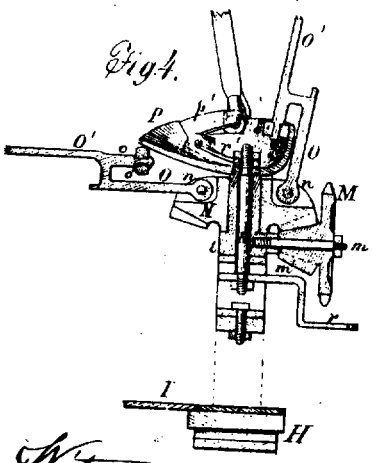

Figure 4, a vertical section through [illegible] same, at the line *y y* of fig. 3.

The driving-wheels A $A^1$ revolve loosely on the main axle B, with which they are locked, when moving forward, by suitable backing-ratchets, *a*.

The main frame C is mounted on the main axle, arranged between these wheels, carries a seat, D, for the driver, and has a tongue, E, projecting from its inner front corner.

An arm, F, projects from the main frame or from the tongue, and supports the forward end of a drag-bar, G, with which it is united [illegible] swiveling connection.

This drag-bar terminates in a shoe, to which another shoe, H′, is pivoted, by a hinge at its rear end, behind and parallel with the finger-beam, and to this supplementary shoe H′ the finger-beam is rigidly secured, by which means the angle of the supplementary shoe and guards, relatively to the ground, may be varied. This device is so common and well known to harvester manufacturers as to need no detailed description here.

A coupling-arm, G′, pivoted in the usual way at one end to the main frame, and at the other to the shoe, supports the drag-bar and finger-beam laterally, while allowing them to vibrate freely around their joints.

The platform I is connected with the finger-beam, and supported by the usual grain-wheel J in any well known way. When reaping, the heel-end of the finger-beam is supported by a cord or chain from the main frame, as usual in machines of this class.

An overhanging bracket, K, mounted on a stud or arm extending upward from the supplementary shoe near its forward end, extends backward over said shoe, as shown in fig. 2.

A frame, L, is secured to this bracket by a set-screw, *k*, which is adjustable backward or forward in a longitudinal slot in the bracket, so as to permit the rake to be set backward or forward, as desired.

A collar or tubular shaft, *l*, fig. 4, secured on this frame, supports a short axle, *m*, carrying a sprocket-pulley, M, and a bevel-pinion, *m′*, which pinion gears into a bevel-wheel, N, revolving on the shaft or collar *l*.

Rake-arms, O, are pivoted to lugs, *n*, on this wheel, so as to vibrate freely in a vertical plane.

An ovoid-shaped bowl-cam, P, is firmly secured on the shaft *l*.

A switch, *p*, fig. 3, forms a part of the periphery of this cam. This switch is located in front of the shaft *l*, and on the grain-side thereof.

A latch, $p^1$, of somewhat similar construction, is located on the same side of the cam, but in rear of the shaft. The switch is opened by a positive movement independent of the rake, while the latch is operated by the rake-arms, as hereinafter explained.

A rock-shaft, R, fig. 4, extends through the collar or shaft *l*, and is oscillated by a crank, *r*, operated at intervals by the driver, seated on the main frame, by means of a link-rod, *q*, and foot-lever Q.

A crank-arm, $r^1$, on the upper end of the rock-shaft R, is connected, by a link, $r^2$, with a lug, $p^2$, on the switch *p*, by which means the switch may be opened, when desired, by the driver, from his seat on the machine.

A spring, $p^3$, tends constantly to keep this switch closed.

Each of the rake-arms O is bifurcated, as shown in the drawing, one branch, $O^1$, being bent upward a short distance, and again bent out horizontally, while the other branch, $O^2$, is bent backward horizontally at an angle to its arm O.

A stud or elbow, *o*, projecting backward from the upper branch, $O^1$, carries a friction-roller, $o'$, which runs on either side of the cam P, as hereinafter explained.

Beaters, S $S^1$ $S^2$ $S^3$, are secured to each of the branches $O^1$, and rakes, T $T^1$ $T^2$ $T^3$, are, in like manner, secured to each of the branches $O^2$.

In the drawing four rakes and a corresponding number of beaters are shown, but this number might be increased, if preferred.

The machine is to be provided with a proper cutting-apparatus, gearing, and all other requisites of a fully-organized harvester.

A sprocket-wheel, B', on the main axle, drives the pulley M by means of a chain, and rotates the rakes by means of the gears $m'$ and N.

The cam P is made in the shape shown in the drawing, so as to hold the rakes nearly vertical when passing around the stubble-side of their axis of rotation.

The friction-rollers $o'$ ordinarily run on the upper or inner side of the cam P, and thus hold the rakes high enough merely to reel back the grain without sweeping it from the platform.

When a gavel of sufficient size has accumulated on the platform, the driver, with his foot, operates the treadle Q, so as to draw forward the crank $r$ and turn the rock-shaft R. This movement retracts the crank $r^1$ and opens the switch $p$, by drawing its front edge inward, thus breaking the continuity of the cam and leaving an opening through which the first friction-roller $o'$ that comes along escapes from the inner to the outer side of the cam.

The roller now runs on the under side of the cam, which is so shaped as to bring the rake down upon the platform to sweep off the gavel, and to hold it down while raking off. If the switch were held open, each rake, in succession, would pass through the switch-opening and act as a rake, but, ordinarily, the driver releases the treadle as soon as one rake has passed the switch, which is closed at once by the spring $p^3$, and the rollers of the other rakes run on the inner side of the cam, and thus keep their rakes so much elevated that they act as gatherers only.

The arm O of the roller, which passes down through the switch-opening after the discharge of the gavel, strikes an arm, V, inclined backward and upward, (see fig. 2,) and is lifted until its roller opens the latch $p^1$, and passes into the inside of the cam again. The operation described is repeated at each discharge of a gavel.

My method of operating the switch through the center of the rake-shaft is a very convenient and advantageous one, as it secures a compact arrangement of the mechanism at a point where it is protected from accidents. I am likewise enabled to mount my cam directly upon the post or shaft around which the rakes revolve, to locate said cam above the rake-arms, and to operate these arms in a very simple manner by rollers running alternately on opposite sides of a single cam.

It is obvious that the rakes alone would work effectively without the beaters. The beaters might also be used on the side of the rake opposite to that shown in the drawing.

It is likewise obvious that the rake could be changed from a controllable rake to a positively automatic rake by keeping the switch open. By removing three of the rakes a gavel would be discharged at every revolution, and, by taking off two alternate rakes, two gavels would be discharged at each revolution of the rake.

I am aware that a double rake-head has been used, but both rakes, in such case, were in the same horizontal plane.

I am also aware that a cam has been supported on a tubular rake-post, and provided with switches operated by mechanism located beneath said cam, but I am not aware of any rake, prior to mine, in which the switch-controlling mechanism was located above the cam and operated by a rock-shaft passing concentrically through the cam and rake-support.

I claim as my invention—

1. The combination of the cam and its switch with the rock-shaft for opening the switch, passing through the axis of rotation of the rakes, substantially as set forth.

2. The combination of the cam, the switch, the rock-shaft, (which opens said switch,) passing through the axis of rotation of the rakes, and the spring above the cam to close the switch, substantially as set forth.

3. The arrangement of the switch-controlling mechanism above and inside the cam, as set forth.

4. The combination of the bifurcated arm, which carries the rake and reel-beater with a continuously-rotating combined reel and rake, as set forth.

5. The combination of the cam, the switch, the bifurcated arm, the friction-roller, and its arm $o$, all these parts being constructed to operate as set forth.

6. The combination of the series of bifurcated arms, the continuously-rotating rakes, and the beater-arms, interposed between the rake, each arm carrying a rake and a beater, as set forth.

AMOS RANK.

Witnesses:
WILLIAM H. KIDD,
WILLIS CADWALLADER.